United States Patent
Farrokhabadi et al.

(10) Patent No.: US 12,355,254 B2
(45) Date of Patent: Jul. 8, 2025

(54) SYSTEMS AND METHODS FOR DYNAMIC TUNING OF CONTROLLER IN POWER GRIDS

(71) Applicant: BluWave Inc., Ottawa (CA)

(72) Inventors: Mostafa Farrokhabadi, Ottawa (CA); Alexander Linchieh, Ottawa (CA); Devashish Paul, Ottawa (CA)

(*) Notice: Subject to any disclaimer, the term of this patent is extended or adjusted under 35 U.S.C. 154(b) by 709 days.

(21) Appl. No.: 17/528,830

(22) Filed: Nov. 17, 2021

(65) Prior Publication Data

US 2023/0155387 A1    May 18, 2023

(51) Int. Cl.
G05B 13/04 (2006.01)
H02J 3/38 (2006.01)

(52) U.S. Cl.
CPC ............ H02J 3/381 (2013.01); G05B 13/042 (2013.01); *H02J 2203/20* (2020.01); *H02J 2300/20* (2020.01)

(58) Field of Classification Search
CPC .. G06N 3/126; H02J 3/00; H02J 3/004; H02J 3/46; H02J 3/381; H02J 2203/20; H02J 2300/20; H02J 2300/28; G05B 13/02; G05B 13/04; G05B 13/042; G05B 13/048
See application file for complete search history.

(56) References Cited

U.S. PATENT DOCUMENTS

| | | | |
|---|---|---|---|
| 7,363,280 B2 * | 4/2008 | Jin | G06N 3/126 706/45 |
| 7,516,423 B2 * | 4/2009 | De Smedt | G06F 30/327 716/132 |
| 7,536,364 B2 * | 5/2009 | Subbu | G06F 18/2113 700/32 |
| 7,769,474 B2 * | 8/2010 | Fregene | G05B 13/0275 700/19 |
| 7,921,371 B1 * | 4/2011 | Roubtsov | G06F 30/15 715/764 |

(Continued)

OTHER PUBLICATIONS

Franklin Y. Cheng, Multiobjective Optimum Design of Structures With Genetic Algorithm and Game Theory: Application to Life-Cycle Cost Design, Computational Mechanics in Structural Engineering, Elsevier Science Ltd, 1999, pp. 1-16. https://doi.org/10.1016/B978-008043008-9/50039-9. (Year: 1999).*

(Continued)

*Primary Examiner* — M. N. Von Buhr
(74) *Attorney, Agent, or Firm* — Borden Ladner Gervais LLP

(57) ABSTRACT

Methods and systems relating to improvements in controlling power grid systems are provided. Improvements include dynamic tuning of compromise optimization control in power grid systems. The controlling of assets associated with a power grid system may include optimizing for several conflicting objectives. The performance of the optimization with respect to each objective may be monitored in real-time or near real-time and based on streaming and historic data relating to the system. The optimization may be adjusted in real-time or near real-time when it is determined that the performance of the optimization is not meeting specific levels of performance in regard to one or more of the conflicting objectives. Further, user input may be provided to the system to assign priority levels to one or more of the conflicting objectives.

17 Claims, 5 Drawing Sheets

(56) References Cited

U.S. PATENT DOCUMENTS

| | | | | |
|---|---|---|---|---|
| 10,474,952 | B2* | 11/2019 | Thompson | G06N 3/126 |
| 10,734,811 | B2* | 8/2020 | Doherty | G05B 13/042 |
| 11,336,092 | B2* | 5/2022 | Diao | H02J 3/001 |
| 11,355,937 | B2* | 6/2022 | Hertz-Shargel | H02J 3/46 |
| 11,379,730 | B2* | 7/2022 | Thompson | G06N 3/126 |
| 11,443,252 | B2* | 9/2022 | Lin | G06Q 10/04 |
| 11,676,038 | B2* | 6/2023 | Thompson | G06N 3/126 |
| | | | | 706/13 |
| 11,735,916 | B2* | 8/2023 | Mehra | G06Q 50/06 |
| | | | | 700/291 |
| 11,785,749 | B2* | 10/2023 | Garcia-Gabin | H05K 7/20209 |
| | | | | 361/688 |
| 11,928,583 | B2* | 3/2024 | Turgeman | G06N 3/08 |
| 2006/0247798 | A1* | 11/2006 | Subbu | G06N 3/126 |
| | | | | 700/28 |
| 2020/0192307 | A1* | 6/2020 | Wee | G06N 20/00 |
| 2020/0271088 | A1* | 8/2020 | Shen | F03B 13/06 |
| 2022/0146128 | A1* | 5/2022 | Bassa | F24F 11/64 |

OTHER PUBLICATIONS

Yang Z, et al. Epsilon constrained method for constrained multiobjective optimization problems: some preliminary results. GECCO Comp '14: Proc. of the Companion Publication of the 2014 Annual Conference on Genetic and Evolutionary Computation, pp. 1181-1186. https://doi.org/10.1145/2598394.2610012. (Year: 2014).*

Hoseyn Sayyaadi (2021). Chapter 6—Optimization basics. In: Modeling, Assessment, and Optimization of Energy Systems, Academic Press, pp. 327-430. https://doi.org/10.1016/B978-0-12-816656-7.00006-3. (Year: 2021).*

Buckley., "Fuzzy Hierarchical Analysis," Fuzzy Sets and Systems, 1985, vol. 17(3), pp. 233-247.

Chiou et al., "Multiple Objective Compromise Optimization Method to Analyze the Strategies of Nanotechnology in Taiwan," 2009 Symposia and Workshops on Ubiquitous, Autonomic and Trusted Computing, 2009, 172-177.

Fares., "Renewable Energy Intermittency Explained: Challenges, Solutions, and Opportunities," Scientific American, Mar. 2015. URL : https://blogs.scientificamerican.com/plugged-in/renewable-energy-intermittency-explained-challenges-solutions-and-opportunities/, accessed: Dec. 3, 2020.

Guedas and Depince, "A Compromise Definition in Multiobjective Multidisciplinary Design Optimization," 8th World Congress on Structural and Multidisciplinary Optimization, Jun. 2009, 11 pages.

Jin et al., "Data-Driven Evolutionary Optimization: An Overview and Case Studies," IEEE Transactions on Evolutionary Computation, 2019, vol. 23(3), pp. 442-458.

"Levelized Cost of Energy, Levelized Cost of Storage, and Levelized Cost of Hydrogen 2020," Lazard, Oct. 2020, 7 pages. URL :https://www.lazard.com/perspective/lcoe2020, accessed: Dec. 3, 2020.

Lootsma et al., "Controlling the Search for a Compromise Solution in Multi-Objective Optimization," Engineering Optimization, 1995, vol. 25(1), pp. 65-81.

Pina et al., "The Impact of Demand Side Management Strategies in the Penetration of Renewable Electricity," Energy, 2012, vol. 41(1), 128-137.

Voronin., "A Compromise Method in Constrained Optimization Problems," Cybernetics and Systems Analysis, 2013, vol. 49(1), pp. 77-80.

Zhou et al., "Big Data Opportunities and Challenges: Discussions From Data Analytics Perspectives," IEEE Computational Intelligence Magazine, Oct. 2014, vol. 9(4), 62-74.

* cited by examiner

SYSTEMS AND METHODS FOR DYNAMIC TUNING OF CONTROLLER IN POWER GRIDS

FIELD

The present disclosure relates to controlling electrical power grid systems.

BACKGROUND

As a result of environmental and regulatory targets to reduce carbon emissions from electricity generation, power grids are currently undergoing a major transition away from centralized, fossil fuel-powered generation sources. Renewable energy sources have emerged as an alternative source of electricity to generate less carbon emissions. This has resulted in increased penetration of renewable electricity generation, for example wind and solar power, and distributed energy resources, for example electric vehicles, and battery energy storage systems, within a power grid.

Electricity that is supplied by renewables is highly variable and fluctuates throughout the day. Renewable energy sources are also not dispatchable by the operator, and thus the operator must plan for fossil fuel-based generation to meet the remaining demand. Dispatchable power generation generally refers to power sources that can be dispatched on-demand upon a request from a power grid operator. If renewable energy is not properly predicted, or fossil-fuel-based generation is overprovisioned, then the excess renewable energy may be curtailed. Excess renewable energy that is curtailed represents a lost opportunity to reduce carbon emissions, as this excess energy is often replaced by fossil-fuel-powered generation. These effects are compounded with increasing renewable and distributed energy resources (DERs) penetration in the electrical grid. As the grid has relatively low amounts of storage capacity relative to generation, the balance between electrical supply and demand is typically maintained by dispatchable fossil-fuel-based units in order to prevent power blackout or brownout scenarios.

This balance between electrical supply and demand is often constrained to energy cost and carbon emissions targets. At the same time, there may be an attempt to minimize electricity costs and carbon emissions from electricity generation. Dispatchable electrical generation required to service last-minute, or peak demand, is oftentimes expensive and emits high levels of carbon emissions. Likewise, the lowest cost sources of electricity at a given point in time are not always the lowest emitters of greenhouse emissions. An operator balancing the various electricity in the grid must typically choose between the conflicting objectives. This, therefore, represents a multiple objective compromise optimization, where the compromise is not clearly defined.

Further, the intermittent nature of renewables is especially challenging to the daily planning and operation of electrical grids. Integration of these technologies increases complexity to the control paradigm of the power grids.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Embodiments of the present disclosure will now be described, by way of example only, with reference to the attached Figures.

Figure 1:
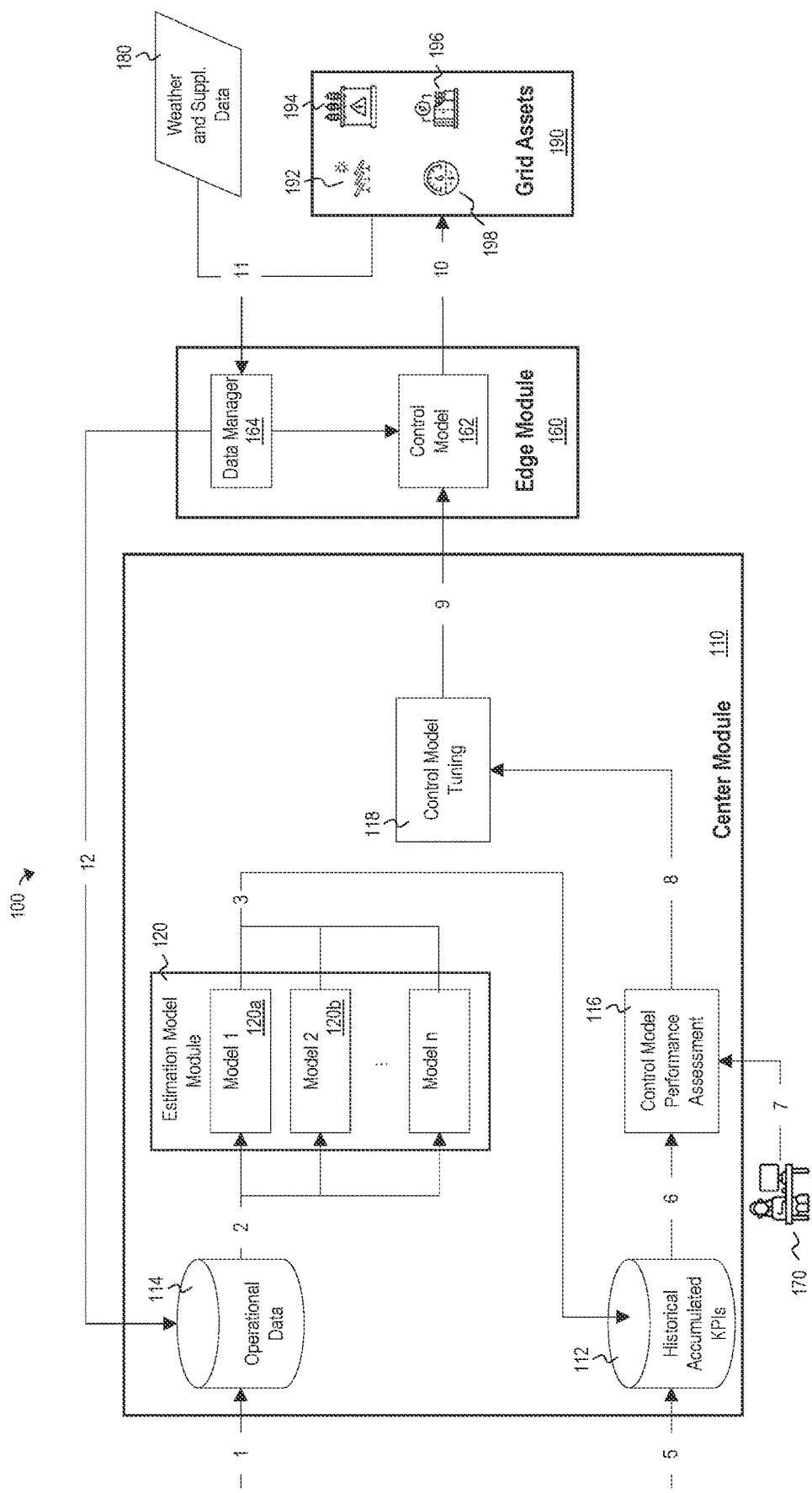
FIG. 1 is a block diagram of an example system for controlling assets in a power grid system.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

The present disclosure generally relates to improvements in optimization control in power grid systems. In particular, the present disclosure relates to dynamic tuning of compromise optimization control in power grid systems.

A continual balancing of electrical supply and demand is often done while attempting to meet energy cost and carbon emissions targets. Simultaneously, there may be an attempt to minimize electricity costs and carbon emissions from electricity generation. Dispatchable electrical generation required to service sudden demand and/or peak demand is often expensive and also typically emits high levels of greenhouse gases. Dispatchable power generation generally refers to power sources that can be dispatched on-demand upon a request from a power grid operator. Further, lowest-cost sources of electricity generation at a given point in time are not always the lowest emitters of greenhouse gases. Moreover, the intermittent nature of renewable power generation sources is typically especially challenging to the daily planning and operation of electrical grids. Accordingly, a power grid operator often must choose between two or more conflicting objectives, and the task is often complicated by further constraints. This represents a multiple objective compromise optimization where the trade-off is not always clearly defined.

Some mere examples of objectives of an intelligent power grid control system, which may be conflicting, include: maximize utilization of renewable energy resources; minimize energy costs from electrical generation; minimize carbon, greenhouse gas, and/or pollutant emissions emitted from fossil fuel-powered electricity generation; maximize generation of carbon offsets and/or renewable energy credits; ensure operational stability of electrical grid. A carbon offset is a reduction in emissions of greenhouse gases done to compensate for emissions made elsewhere. A party may be paid for achieving carbon offsets. A carbon credit relates to an instrument representing the right to emit carbon dioxide or other greenhouse gas(es).

With increased penetration of renewable resources and DERs, there is often complex behavior and interdependencies of several factors, such as for example fluctuating renewable energy generation, variable demands, electricity cost, and/or emissions such as carbon or other greenhouse gas emissions, all while considering other factor(s) such as for example the effects of carbon offsets and/or renewable energy credits on net energy cost minimization. Of course, these factors are merely examples. Other factors are contemplated.

According to the present disclosure, techniques are provided relating to combining multi-objective compromise optimization mechanisms for improving the performance of power grid systems. Techniques are also provided relating to enabling users to guide the multi-objective compromise optimization by inputting subjective preferences in a live operational environment. Techniques are also provided relating to an automated mechanism that tunes the problem parameters in real-time, based on the cumulative measurement collected throughout the system operation. Techniques are also provided relating to dynamically and intelligently invoking a compromise optimization control strategy in response to features of the control system to facilitate an improved control mechanism for exploiting the variable energy costs and carbon emissions in a power system. Techniques are also provided relating to a method for which preferences, for example of a system operator, and cumulative system measurements may be fed into a multi-objective compromise optimization engine in a real-time operational environment, and for the optimization engine to automatically adapt to the user's preferences and cumulative system measurements in real-time or near real-time.

In a simplified, non-limiting example to illustrate aspects according to the present disclosure, a power grid may be capable of receiving power from a coal fired generation plant(s) and from a solar generation plant(s). The system may have one or more objectives associated with controlling assets in the grid. A first objective of a power grid controller may be to maximize the predictability and reliability of the power source, meaning a known quantity of power is available when it is needed. A second objective of the power grid controller may be to minimize greenhouse gas emissions caused by the generation of the used power. A third objective of the power grid controller may be to minimize the marginal costs associated with generating electricity. Coal fired generation can have a high level of predictability and reliability but a low level of reduced greenhouse gas emissions (meaning higher emissions) and medium marginal cost of generation. In contrast, solar generation can have a low level of predictability and reliability, high level of reduced greenhouse gas emissions, and low marginal cost of generation. In this way, the first and second objective are at least partly conflicting since higher predictability and reliability comes at a trade off for lower greenhouse gas emissions. The first and third objectives are also partly conflicting as the operator must choose to dispatch more coal at the cost of higher cost of generation.

The power grid controller may be configured to maximize predictability and reliability, maximize greenhouse gas emissions savings, and maximize marginal cost of electricity generation savings. To do so, the power grid controller may be adapted to prioritize the first, second, and third objectives according to a predefined, and optionally user-specified, prioritization. In an example, a prioritization may be based on key performance indicators (KPI) corresponding to each objective. A key performance indicator (KPI) is generally a quantifiable value, or other information, that is used to monitor and measure effectiveness or other performance. A KPI may be used to measure progress toward an intended goal or result. Thus, KPI may constitute or comprise performance information. In the present disclosure, a higher KPI is considered more desirable, therefore objectives are framed such that the system strives to maximize the KPI. For example, carbon emissions may be reframed as "reductions in carbon emissions" so that a higher KPI is desirable rather than undesirable. However, it is to be appreciated that in other embodiments, a lower KPI may be considered more desirable, and objectives may be framed such that the system strives to minimize the KPI. The teachings of the present disclosure may then be adapted to account for a minimization rather than a maximization. Further, KPIs may be calculated in any suitable manner.

As a mere illustrative example, in an embodiment having two conflicting objectives, the power grid controller may bet set to prioritize the first and second objectives equally (or in another sense, neither is prioritized). In another example, the power grid controller may bet set to assign predictability and reliability a higher priority relative to reduced greenhouse gas emissions.

In an embodiment, there may be two or more conflicting objectives and one or more non-conflicting objectives.

In another example, an embodiment may have three or more conflicting objectives. As such, the power grid controller may be set with multiple KPIs, each corresponding to one of the objectives. As a mere example, multiple KPI targets may correspond to: CO2 emissions ($KPI_1$), predictability and reliability of the power source ($KPI_2$), and marginal energy generation costs ($KPI_3$). Each objective may have a dynamic weighting ($\omega_n$), and a compromise objective function may resemble the following:

$$\omega_1 KPI_1 + \omega_2 KPI_2 + \ldots + \omega_n KPI_n \text{ where}$$
$$\omega_1 + \ldots + \omega_n = 1$$

A control model of the power grid controller may include a compromise objective function for performing the multi-objective compromise optimization. Each weighting $\omega_n$ may be a coefficient to its respective KPIn in the compromise objective function, and the values of the weightings $\omega_e$ indicate, by proxy, relative priorities of each objective relative to the other objectives. For instance, in an example where minimizing CO2 emissions is decided to be more important than the predictability and reliability of the power source(s), then the weighting associated with the KPI associated with the CO2 emissions objective may be given a higher value than the weighting associated with the KPI associated with the predictability and reliability objective. In a sense, the weighting values relative to one another may be considered a prioritization ratio, for example $\omega_1:\omega_2:\omega_3:\omega_4$., which in an mere example could be 1:2:2.5:0.5. The weighting ($\omega_n$) may be dynamic in the sense that it may be adjusted as time passes, for example on a continuous basis, intermittently, and/or periodically, in order to reflect a change in user preferences and/or to ensure the desired relative prioritization of the objectives is actually realized by the system in practice. For instance, if the weightings are set at initial values to provide a desired prioritization but the system is not actually achieving that periodization, then the weightings may be adjusted so that the system performance more closely tracks the desired relative prioritization among the objectives.

Over time, the performance of the power grid controller in terms of whether it is achieving a predefined performance level may be monitored. When the performance level of the power grid controller falls outside of a desirable range, meaning the power grid controller performance is not acceptable, the power grid controller may be re-tuned to have the power grid controller more closely track the predefined performance level of the conflicting objectives. For instance, if the performance differs from a predefined performance level (for example by more than a threshold), then it may be considered that the prioritization of the objectives should be adjusted in the optimizer to give more priority to one or more of the objectives relative to the other objective(s). The re-tuning of the power grid controller may be performed in any suitable way, for example by adjusting optimization parameters or models, for example by adjusting one or more of rules of a rule-based control model, adjusting coefficients of a machine learning based control model, or adding, removing, and/or replacing a model with a different control model.

In an aspect, separate from the model(s) run by the power grid controller, the system may utilize other estimate models, which may be configured to each optimize for a specific objective of the system with no consideration to the other objective(s) of the system. Thus, these models may be non-compromised models. In this way, the system may estimate a maximum (or minimum) theoretical value for each of its respective objectives. These theoretical values are referred to as model KPIs (MKPIs). These values may then be used in by the system to determine if and how to re-tune the power grid controller.

In some embodiments, the system may comprise a first estimation model for optimizing for the first objective without regard to the other objectives, a second estimation model for optimizing for the second objective without regard to the other objectives, and so forth. Each of these estimation models may be considered to be a non-compromised model since it optimizes for its single objective without regard to any other objective(s), and is thus non-compromised. The first estimation model may generate a first model KPI (MKPI) associated with the first objective, and the second estimation model may generate a second MKPI associate with the second objective, and so forth. The model KPIs may be generated based on operational data of the system, including historical data of the power grid controller. Depending on whether the system is achieving the intended KPI targets or not, a comparison using the MKPIs may be used to determine how to re-tune the compromise optimization model. For example, in an embodiment with two conflicting objectives, if the controller is not meeting the predefined performance level in regard to objective 1, the power grid controller may be adjusted by changing, for example increasing, the prioritization of the first objective. More generally, for systems having two or more conflicting objectives, in order to determine whether or not the system is achieving the intended KPI targets or not, the actual historical KPI values from the real-world deployment, $HKPI_n$, may be compared with a historical record of model KPIs, referred to as $HMKPI_n$, where n represents the number of objectives. $HKPI_n$ reflects the real-world optimization which includes the effects of compromise optimization. $HKPI_n$ will typically fall short of HMKPIn, which reflects a scenario only one objective is being optimized for (no compromise optimization). The difference between $HKPI_n$ and $HMKPI_n$ may be compared to a threshold $Th_{KPIn}$, which may be set to reflect the operator's preference. If the normalized difference between $HKPI_n$ and $HMKPI_n$ exceeds a given threshold $Th_{KPIn}$ value multiplied by the average between the normalized values of $HKPI_n$ and $HMKPI_n$ for the other variables, then the system may re-tune the control model to increase the prioritization of objective n. For example, in a scenario seeking to maximize a given objective j and thus $KPI_j$, if $HKPI_j$ is falling below $HMKPI_j$ by more than threshold $Th_{KPIn}$, the power grid controller may be adjusted by increasing the target prioritization of objective j corresponding to $KPI_j$.

Again, this is a non-limiting example to illustrate aspects according to the present disclosure. In other aspects and embodiments, different numbers and/or types of power generation are contemplated, and/or different numbers and/or types of system optimization objectives are contemplated.

In an aspect, the present disclosure relates to a method comprising at one or more electronic devices each having one or more processors and memory, controlling a plurality of assets in a power grid system, the controlling comprising receiving live operational data associated with the power grid system, using a controller having an optimizer for performing multi-objective compromise optimization for a plurality of conflicting objectives based on the live operational data, wherein the plurality of conflicting objectives are associated with the controlling the plurality of assets, generating historical performance information of the controller in relation to at least one of the plurality of conflicting objectives based on the received live operational data, determining if a performance of the controller meets a predefined level of performance in relation to at least one of the plurality of objectives based on the historical performance information of the controller, and adjusting the optimizer of the controller in response to determining that the performance of the controller does not meet the predefined level of performance.

In an embodiment, the adjusting the optimizer comprises changing a prioritization of the at least one objective in the multi-objective compromise optimization for which the controller does not meet the predefined level of performance.

In an embodiment, the changing a prioritization of the at least one objective comprises changing a value of a coefficient associated with the at least one objective in a multi-objective compromise optimization function.

In an embodiment, the method further comprises using an estimation model to perform a single-objective optimization for one of the plurality of conflicting objectives without regard to the other of the plurality of conflicting objectives, and generating historical model performance information of the controller in relation to the one of the plurality of conflicting objectives based on an outcome of the single-objective optimization, wherein the determining if a performance of the controller meets a predefined level of performance in relation to the one of the plurality of conflicting objectives is based on the historical performance information and on the historical model performance information of the controller in relation to the one of the plurality of conflicting objectives.

In an embodiment, the method further comprises receiving predefined threshold information associated with the at least one of the plurality of objectives, wherein the determining if a performance of the controller meets a predefined level of performance in relation to the at least one of the plurality of objectives is further based on the predefined threshold information.

In an embodiment, the receiving, the generating, the determining, and the adjusting are all preformed within a predefined time interval, wherein the predefined time interval is 1 hour.

In an embodiment, at least one of the plurality of assets in the power grid system receives power from a renewable power generation source.

In an aspect, the present disclosure relates to a system, comprising one or more processors, and memory storing instructions for execution by the one or more processors, the instructions for operations comprising controlling a plurality of assets in a power grid system, the controlling comprising receiving live operational data associated with the power grid system, using a controller having an optimizer for performing multi-objective compromise optimization for a plurality of conflicting objectives based on the live operational data, wherein the plurality of conflicting objectives are associated with the controlling the plurality of assets, generating historical performance information of the controller in relation to at least one of the plurality of conflicting objectives based on the received live operational data, determining if a performance of the controller meets a predefined level of performance in relation to at least one of the plurality of objectives based on the historical performance information of the controller, and adjusting the optimizer of the controller in response to determining that the performance of the controller does not meet the predefined level of performance.

In an embodiment, the adjusting the optimizer comprises changing a prioritization of the at least one objective in the multi-objective compromise optimization for which the controller does not meet the predefined level of performance.

In an embodiment, the changing a prioritization of the at least one objective comprises changing a value of a coefficient associated with the at least one objective in a multi-objective compromise optimization function.

In an embodiment, the system further comprises using an estimation model to perform a single-objective optimization for one of the plurality of conflicting objectives without regard to the other of the plurality of conflicting objectives, and generating historical model performance information of the controller in relation to the one of the plurality of conflicting objectives based on an outcome of the single-objective optimization, wherein the determining if a performance of the controller meets a predefined level of performance in relation to the one of the plurality of conflicting objectives is based on the historical performance information and on the historical model performance information of the controller in relation to the one of the plurality of conflicting objectives.

In an embodiment, the system further comprises receiving predefined threshold information associated with the at least one of the plurality of objectives, wherein the determining if a performance of the controller meets a predefined level of performance in relation to the at least one of the plurality of objectives is further based on the predefined threshold information.

In an embodiment, the receiving, the generating, the determining, and the adjusting are all preformed within a predefined time interval, wherein the predefined time interval is 1 hour.

In an embodiment, at least one of the plurality of assets in the power grid system receives power from a renewable power generation source.

In an aspect, the present disclosure relates to a non-transitory computer-readable medium having computer-readable instructions stored thereon, the computer-readable instructions executable by at least one processor to cause the performance of operations comprising controlling a plurality of assets in a power grid system, the controlling comprising receiving live operational data associated with the power grid system, using a controller having an optimizer for performing multi-objective compromise optimization for a plurality of conflicting objectives based on the live operational data, wherein the plurality of conflicting objectives are associated with the controlling the plurality of assets, generating historical performance information of the controller in relation to at least one of the plurality of conflicting objectives based on the received live operational data, determining if a performance of the controller meets a predefined level of performance in relation to at least one of the plurality of objectives based on the historical performance information of the controller, adjusting the optimizer of the controller in response to determining that the performance of the controller does not meet the predefined level of performance.

In an embodiment, the adjusting the optimizer comprises changing a prioritization of the at least one objective in the multi-objective compromise optimization for which the controller does not meet the predefined level of performance.

In an embodiment, the changing a prioritization of the at least one objective comprises changing a value of a coefficient associated with the at least one objective in a multi-objective compromise optimization function.

In an embodiment, the operations further comprise using an estimation model to perform a single-objective optimization for one of the plurality of conflicting objectives without regard to the other of the plurality of conflicting objectives, and generating historical model performance information of the controller in relation to the one of the plurality of conflicting objectives based on an outcome of the single-objective optimization, wherein the determining if a performance of the controller meets a predefined level of performance in relation to the one of the plurality of conflicting objectives is based on the historical performance information and on the historical model performance information of the controller in relation to the one of the plurality of conflicting objectives.

In an embodiment, the operations further comprise receiving predefined threshold information associated with the at least one of the plurality of objectives, wherein the determining if a performance of the controller meets a predefined level of performance in relation to the at least one of the plurality of objectives is further based on the predefined threshold information.

In an embodiment, the receiving, the generating, the determining, and the adjusting are all preformed within a predefined time interval, wherein the predefined time interval is 1 hour.

Aspects and advantages according to the present disclosure will be apparent from the following, taken in conjunction with the accompanying drawings, wherein are set forth, by way of illustration and example only, certain embodiments according to the present disclosure.

For descriptive purposes, several aspects, embodiments, and features according to the present disclosure are described in relation to particular types of power generation and KPIs. However, this is not intended to be limiting. The teachings according to the present disclosure may be applied to fields and technologies other than power generation and power grids, and/or with different KPIs.

FIG. 1 is a block diagram of an example system 100 for providing control in relation to a group of grid assets 190 in or associated with a power grid according to the present disclosure. System 100 generally comprises center module or subsystem 110 and edge module or subsystem 160, which cooperate to control one or more controllable assets among grid assets 190 of a power grid system. Grid assets 190 may alternatively or additionally include one or more non-controllable assets. A controllable asset may be any suitable asset, such as a device, machine, vehicle, system, or other object, in the power system that may be controlled. Mere examples of controllable assets are battery energy storage systems (BESS), distributed energy storage systems (DESS), thermostatically controllable loads (TCL), heating, ventilation, air conditioning (HVAC) devices or systems, and electric vehicles, including batteries of electric vehicles.

Edge module 160 may be configured with control model 162 for optimized controlling of controllable assets. Control model 162 may be alternatively referred to as a controller. Edge module 160 may send, or otherwise provide, control signals to the power grid and/or to controllable assets in the power grid (e.g. signal 10). Center module 110 may comprise control model performance assessment module 116 and control model tuning module 118 for assessing the performance of, and if appropriate, adjusting the parameters of, control model 162.

Although system 100 is shown as comprising center module or subsystem 110 and edge module or subsystem 160, it is to be appreciated, however, that in other embodiments, system 100 may not be subdivided into center module 110 and edge module 160 as herein shown and described, or even subdivided at all.

In this embodiment, the example assets 190 may include a solar power generation plant(s) or other source(s) 192, transformers 194, fossil-fuel-based generation 196, and/or metering infrastructure 198. However, grid assets 190 in the power grid may include any suitable controllable assets or components, such as dispatchable energy resources or load(s), example including charging infrastructure, electric vehicle (EV) batteries, battery energy storage systems, building management systems, to name but a few. The controlling of controllable assets may involve any type or types of control. As mere examples, control may relate to the type(s) of power generation to use to supply power to the power grid (e.g. coal, gas, and solar), and/or the proportions, ratios, and/or amounts of the various types of power generation to use (e.g. 60% coal, 10% gas, and 30% solar). wherein the controlling a plurality of assets in the power grid system Together, the proportions may be referred to as a blend of different types of power generation. These control parameters may be based on the relative priorities assigned to conflictive objectives of system 100, as described herein. The control signals may include other control information for providing control of controllable asset(s) among the grid assets 190. Other mere examples of control signals include, but are not limited to, a signal to charge or discharge a battery, a signal to buy or sell power to the power grid, a signal to import power from fossil fuel producer, a signal to charge or discharge an energy storage system, a signal of a charging or discharging rate.

In some power grids and other power systems, electrical energy is stored in energy storage systems or devices for later use. For instance, energy may be stored when energy can be purchased at a lower rate, when there is an oversupply of energy, and/or when demand is low. When there is an oversupply of energy, storing surplus energy may be done instead of sending the energy to an upper grid. Further, energy storage systems are useful for storing energy from intermittent power plants, sometimes called variable power plants, such as renewable sources, including solar, wind, or tidal power. In an intermittent power plant, power is not always dispatchable due the fluctuating nature of the energy source. The stored energy may be used at a later time, for example to reduce the amount of power imported from the upper grid, or to handle an unexpected increase in net demand. An unexpected increase in demand can occur, for instance, due to inaccurate demand forecasting. Also, using power stored in energy storage systems to satisfy some power demand may sometimes be cheaper than buying power from the upper grid.

Control model 162 may comprise an optimizer and may be configured to optimize for two or more objectives, where at least some of the objectives are conflicting objectives. For simplicity, some embodiments described herein are described as optimizing for two conflicting objectives. A mere example is to maximize power generation reliability (first objective) and to also minimize greenhouse gas emissions caused by used power (second objective). Center module 110 may be configured to assess the performance of control model 162 and to tune or adjust control model 162 when it is determined that the performance differs from a predefined desired performance, for example when the performance falls outside out a predefined range.

Control model 162 may be configured based on predefined prioritization parameters, which allocate priorities among conflicting optimization objectives of control model 162. This may be done, for instance, where there is a need or desire to give one or some of the objectives a higher priority than others. The predefined prioritization may be specified by, for example, an operator 170 of the power grid system. Control model 162 may comprise any suitable optimization techniques and algorithms, and is not limited to only model based optimization. These may include model(s) including but limited to rules-based models, and/or data-driven approaches which may be based on artificial intelligence and/or machine learning algorithms. In some embodiments, algorithms, techniques, and/or approaches according to the present disclosure may be performed or based on artificial intelligence algorithms, techniques, and/or approaches. In some embodiments, the algorithms and techniques may include machine learning techniques.

Edge module 160 may also comprise data manager 164, which may aggregate and/or pre-processes data received from one or more sources, such as sensors, other devices in the grid, such as grid assets 190, and/or from other sources, and may include data such as weather, geographic information systems, equipment specifications, SCADA readings, and/or energy market entities, or supplementary data 180. At least some of this data may be considered live operational data, for example in the sense that it represents current or recent data. This data or information is represented as signal 11. Device or sensors may include, as mere examples, those in solar farms, wind turbines, hydroelectric dams, and/or smart meters. Weather and geographic data may include for example historic and/or current data, such as weather observations and forecasts (such as temperature, humidity, wind speed, wind direction, amount of sun, amount and/or type of precipitation, cloud types, amount and/or type of cloud cover), geographic data (such as maps, topology, etc.). Energy market information may include, for example, information relating to predicted or forecasted energy prices, day ahead energy market prices, time of use energy prices, primary reserve market energy prices, axillary reserve market energy prices, renewable energy prices, local renewable energy prices, or any combination thereof. Further, data manager 164 may convert incoming data from various source(s) into some standardized data format, such as a data frame, allowing for eased use by control model 162 and/or storage. Further, data manager 164 may contain some local cache of operational data used to run control model 162 on an ongoing basis. Further, data manager 164 may perform general processing functions, as well as data cleaning, data conditioning, data warehousing, data aggregation, and/or other operations on some or all of the received data. The received data may then be provided to control model 162, and/or also to the operational data database 114 via signal 12. In another embodiment, control model 162 may receive data other than from data manager 164.

Center module 110 may generally comprise, among others, and/or have access to, one or more databases, such as for example a historical accumulated KPI database 112 and/or an operational data database 114.

Historical accumulated KPI database 112 may generally comprise a collection of historical KPIs (HKPIs) representative of actual past performance of system 100. As mere examples, these may include KPIs for a past amount of carbon dioxide (CO2) emissions for a given power importation, a past amount of CO2 from a gas turbine for a given power importation, or a price for power at a certain time. An HKPI may be calculated over a particular past time horizon or window, such as for example the past 6 hours, 12 hours, day, week, or any other suitable period. Signal 5 represents this type of information being received and stored at database 112. An HKPI value or values may be calculated in any suitable way. For example, an HKPI may be calculated by taking an average of the prior KPIs during a past time window, for instance a previous 6 hours.

Operational data database 114 may generally comprise any suitable type(s) of streaming and/or live, and/or historical data, including those types previously described as being received from data manager 164 of edge module 160. However, some of the data or other information in operational data database 114 is not necessarily received from edge module 160, but instead it may be received from other source(s), as indicated by signal 1.

In operation, the performance of control model 162 may be assessed by control model performance assessment module 116 at center module 110. As previously described, control model 162 may be configured to optimize for two or more conflicting objectives. To do so, control model 162 may be adapted to prioritize objectives according to a predefined, and optionally user-specified, prioritization information. This prioritization information may be specified by an operator 170 of the power grid system. In an example, a prioritization information may be based on key performance indicators (KPI) corresponding to each objective.

The performance of control model 162, in terms of whether it is actually achieving the predefined performance level, may be monitored over time. When the actual performance of the power grid system realized by control model 162 differs from a predefined performance level for one or more of the objectives, for example when the performance falls outside of a desirable range, meaning the performance of control model 162 is not acceptable, control model 162 may be re-tuned to attempt to have control model 162 more closely track the predefined performance level(s) of the conflicting objectives. The re-tuning of control model 162 may be performed by control model turning module 118, as will be described.

As shown in FIG. 1, control model performance assessment module 116 may receive as inputs historical KPI information (signal 6), and predefined performance level information, optionally specified by an operator 170 of the power grid system (signal 7). Predefined performance level information may effectively serve as a dial to specify and/or change how the system prioritizes conflicting objectives. For example, an operator may specify a desire to minimize energy cost, or minimize CO2 emissions, or some combination.

Center module 110 may comprise an estimation model module 120, which may include several different estimation models such as model 1 120a, model 2 120b, . . . , model n. Input to estimation model module 120 may include data from operational database 114, represented by signal 2.

A purpose of estimation module 120 is to generate MKPIs, which may be used by control model performance assessment module 116. The MKPIs generated over time may be stored in historical accumulated KPIs database 112 and are referred to as HMKPI. The estimation models run independently of each other and are focused only on their own objective. For instance, an estimation model may optimize for lowest power cost without any consideration to the level of emissions of the power plants or to the reliability of the power plants. A MKPI is an estimated maximum possible KPI over a certain future time horizon or window of operation such as for example the next 6 hours, 12 hours, day, week, or any other suitable period. In this sense, a model is uncompromised. Each MKPI may serve as a proxy to an individual objective in the overall control model 162. HMKPI may be a rolling window historical value of a KPI if the objective function was greedily optimizing only for that specific KPI (e.g. objective). An HMKPI may be calculated over a particular past time horizon or window, such as for example the past 6 hours, 12 hours, day, week, or any other suitable period. An HMKPI value or values may be calculated in any suitable way. For example, an HMKPI may be calculated by taking an average of the prior MKPIs calculated during a past time window, for instance a previous 6 hours.

Thus, in the present example embodiment, a first estimation model may be configured to maximize, a first objective without any consideration to any of the other objectives, and to generate a corresponding first MKPI (MKPI1). Likewise, one or more additional estimation models may be configured to maximize or minimize as is the case, its respective objective without any consideration to any of the other objectives, and to generate a corresponding MKPI. All of the KPIs together are referred to as MKPIn. These estimation models are separate from control model 162 in edge module 160. However, control model 162 may comprise and/or be based on one or more of the estimation models.

As mere examples, a MKPI may represent an estimated or predicted amount of CO2 that would be emitted given a current state of system 100 including current power generation dispatches, meaning the proportions of different power generation type (for example the amount of coal, the amount of gas, the amount of solar power generation). Another model KPI may represent a power cost given a current state of system 100 including current power generation dispatches.

An estimation model may be any suitable type of model, for example a rule-based model, a machine learning based model, or some combination, etc. An estimation model may comprise an optimizer model(s), a predictor model(s), or some combination. An optimizer module is generally a model that optimizes for maximums or minimums, for example minimizing power cost, or minimizing greenhouse gas emissions. A predictor model generally predicts or estimates some value(s). For example, a predictor may estimate an amount of renewable energy that may be generated in a given future time interval, or estimate an amount of CO2 that is expected to be emitted from various fossil fuel sources, if they are dispatched in a given time interval, or estimate power demand in a given time interval, or estimate energy prices in a given time interval.

Outputs of estimation module 120, represented by signal 3, may be the generated MKPIs, which may be provided to historical accumulated KPI database 112. The difference between the MKPIs may generally reflect the differences in the current individual objectives of control model 162.

Figure 2:
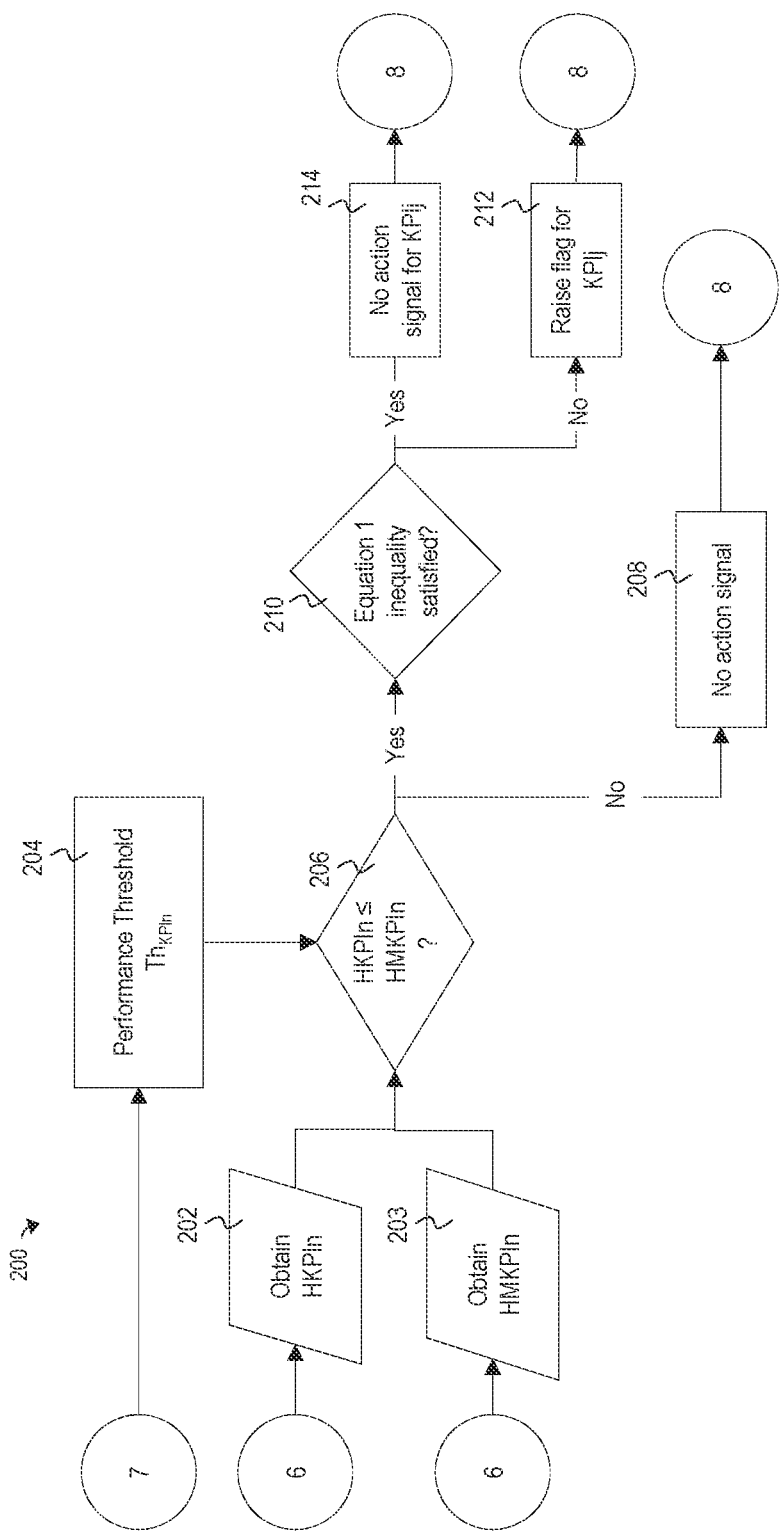
FIG. 2 is a diagram of an example process flow for assessing the performance of a control model.

FIG. 2 is a diagram of an example process flow 200 for assessing the performance of control model 162 by control model performance assessment module 116. This process flow may be performed for each of the objectives 1 through n in the compromise optimization function to identify any objectives that will be reprioritized in the compromise optimization. At block 202 and 203, inputs comprising information relating to historic KPI values are obtained for objective m, where objective m is one of the 1 through n objectives. This information may comprise HKPI and/or HMKPI information. Again, HKPI information may be representative of actual historic performance of system 100, whereas HMKPI relates to historical model KPI values. At block 202, historical KPI information, HKPIm, representing the actual performance of control model 162 in relation to objective m is obtained. At block 203, historical model KPI information (HMKPIm) in relation to objective m may be obtained.

At block 204, a $Th_{KPIm}$ value or information may be obtained associated with objective m. $Th_{KPI}$ values may be user-assigned and may represent the operator's preferences. $Th_{KPIn}$ values each of which represents a predefined acceptable threshold for use in assessing each of the n HKPI, which are the historical KPIs, to decide whether control model 162, for example a compromise objective function at model 162, should be re-tuned. The threshold may be a value by which an HKPI may differ (be below) from its respective HMKPI and may be considered as an acceptable level of performance of the system in terms of that particular objective. So, if an HKPI is below its HMKPI by more than the threshold value $Th_{KPI}$, then the system is considered to be underperforming in relation to that objective, and the control model may be re-tuned to increase the prioritization of that objective. As a mere example, a ThKPI threshold for a first KPI associated with a first objective may be set to 0.5, whereas the ThKPI threshold for the second objective may be set to 1.0. This indicates that the user prefers that the system optimizes for the first objective, which is prioritized over the second objective.

At block 206, it may be determined if the historical KPI (HKPI) in relation to objective m is less than or equal to the historical model KPI (HMKPI) in relation to objective m. $HKPI_m$ will typically be lower than $HMKPI_m$, which reflects a scenario only one objective is being optimized for (no compromise optimization). In such a case, the system will assess at block 210 whether control model 162 will be re-tuned with respect to objective m. On the other hand, if it is determined that HKPIm is greater than HMKPIm for objective m, then the performance of control model 162 is considered acceptable in regard to objective m, and the process proceeds to block 208, where optionally a no action signal may be generated, generally indicating that no re-tuning of control model 162 with respect to objective m is desired. As mentioned, HKPIm may typically be lower than HMKPIm. However, in some situations, it may be possible for HKPIm to be higher than HMKPIm. For example, an objective may be to maximize renewable energy use. The optimizer will maximize solar power based on its own predictions of what solar will be generated for a given time period. However, it is possible that there is more sunlight than what was predicted my estimation model module 120. So, in this case, HKPIm>HMKPIm and thus a flag will not be raised in relation to objective m since the real world behaved better than was predicted.

On the other hand, if it is determined at block 206 that HKPIm is lower or equal to HMKPIm for objective m, the process proceeds to block 210.

At block 210, it is determined if the performance of control model 162 meets a predefined level of performance in regard to the particular objective under consideration. In this example embodiment, the difference between $HKPI_m$ and $HMKPI_m$ is normalized on the left hand side of the inequality:

$$\frac{HMKPI_m - HKPI_m}{HMKPI_m}.$$

This normalized term represents how much the HKPI has varied from the HMKPI (selfish optimization) in a normalized term that ranges from 0 to 1. The closer this value is to 0, the closer HKPI is to the ideal HMKPI value. The further HKPI deviates from HMKPI, then the closer the value will be to 1 (assuming HKPI<HMKPI). This normalized value is calculated for all the conflicting objectives in the optimization.

This normalization takes place so that the objectives may be compared, regardless of the varying magnitudes of the objectives. For example, objectives pertaining to electrical load may be expressed in terms of megawatts, whereas objectives pertaining to renewable energy utilization may be expressed in terms of hours per day. This normalization step prevents oversized objectives from dominating the others. This normalization step is used due to the averaging step on the right side of the inequality in Equation 1.

A normalized value may be compared or otherwise assessed relative to a predefined or pre-calculated performance level. On the right side of the inequality in Equation 1, $Th_{KPIm}$ values may be user-assigned and may represent the operator's preferences. $Th_{KPIm}$ may be set to be within a range of between 0 and 1, where a lower $Th_{KPIm}$ reflects a higher user preference. $Th_{KPIm}$ is multiplied by:

$$Avg\left[\frac{HMKPI_j - HKPI_j}{HMKPI_j}\right]$$

which represents the average of all the normalized values for the various objectives (set of j) in the compromise optimization function except for objective m.

If the normalized difference between $HKPI_m$ and $HMKPI_m$ $$\frac{HMKPI_m - HKPI_m}{HMKPI_m}$$

exceeds a given threshold $Th_{KPIm}$ multiplied by $$Avg\left[\frac{HMKPI_j - HKPI_j}{HMKPI_j}\right],$$

then this means that HKPIm has deviated too much from HMKPIm, relative to the average of the normalized differences between HKPI and HMKPI for the other objectives, and according to user preference (which is represented by $TH_{KPIn}$), the system re-tunes the control model 162 to increase the prioritization of objective n in the compromise objective function. Thus, the performance of control model 162 has not met a predefined level of performance, and thus re-tuning or adjusting of the optimizer of control model 162 may be performed. At block 210, this corresponds to a determination is 'no' in the inequality of Equation 1. The process then proceeds to block 212, where a flag is raised for the particular objective m. The presence of the flag indicates that control model 162 needs, or may need, re-tuning to increase the priority of objective m relative to the priority of one or more other objectives in the compromise objective function. If the determination at block 210 is 'yes', then the process proceeds to block 214 where a no action signal may be generated, indicating that no retuning of control model 162 with respect to objective m is desired. A no action signal may correspond to not raising a flag in relation to objective m. As noted above, the process flow of FIG. 2 may be performed for each of the objectives in the compromise objective function, for example for objectives 1 through n. Thus, signal 8 may comprise an indication of whether a flag has been raised or not for each of the n objectives.

The results of the assessment at control model performance assessment module 116 may be outputted via signal 8, which may be received or otherwise obtained at control model tuning module 118, as shown in FIG. 1.

Control model tuning module 118 is generally configured for adjusting control model 162, which could for example involve changing parameters of control model 162. The adjusting, or re-tuning, of control model 162 may involve adjusting optimization parameters or models, for example by adjusting one or more of rules of a rule-based control model, and/or adjusting coefficients of a machine learning based control model, and/or replacing a model with a different control model, within control model 162. As previously described, in an embodiment, this may involve adjusting weighting coefficients in a compromised objective function. In general, control model tuning module 118 may be configured to adjust control model 162 in any suitable way, for example to change the relative prioritizations of the various objectives.

Figure 3:
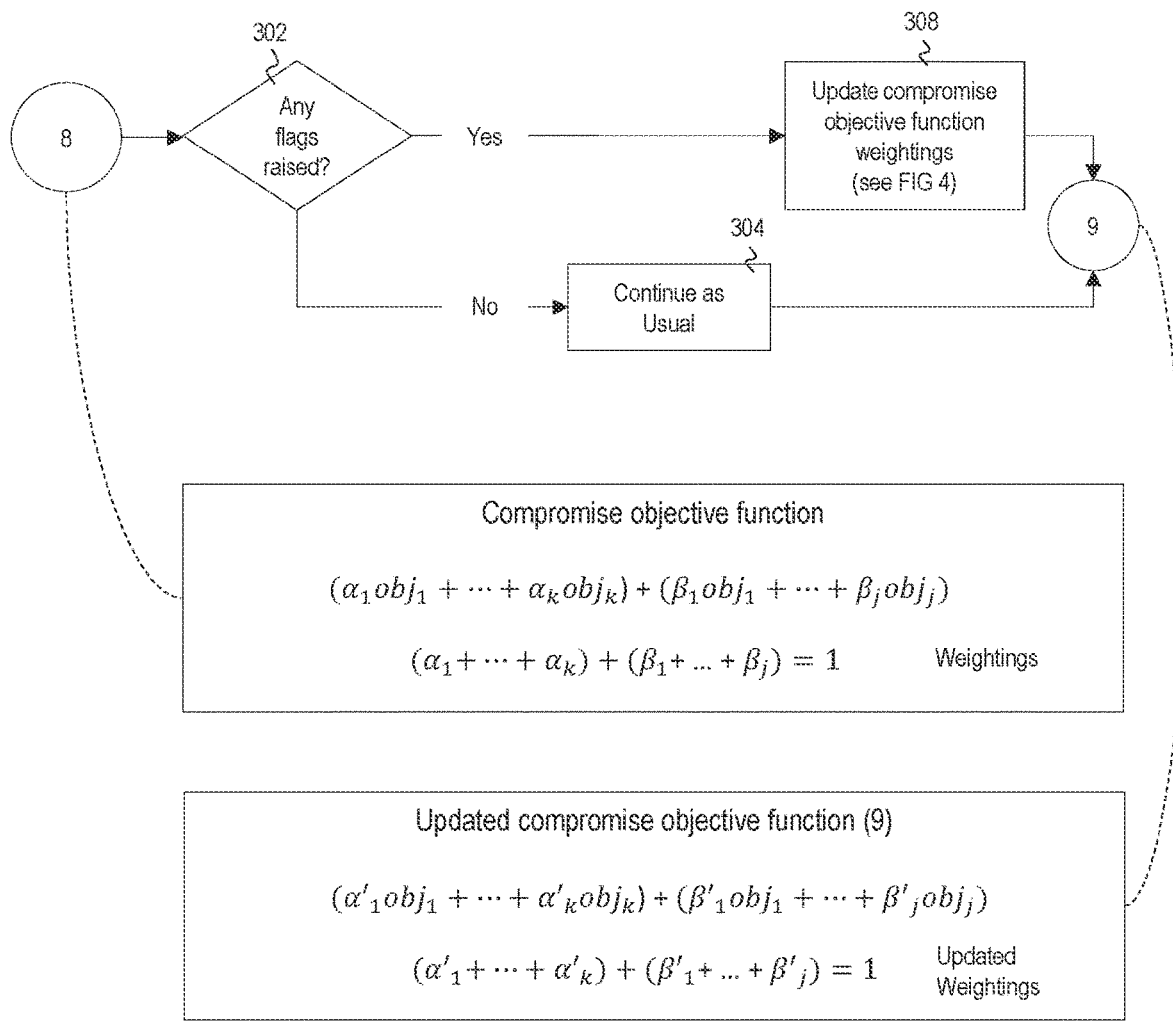
FIG. 3 is a diagram of an example process flow for tuning a control model.

FIG. 3 is a diagram of an example process flow 300 for tuning control model 162 by control model tuning module 118. Generally, in this example embodiment, the value of a weighting α for any objective(s) for which a flag has been raised are increased for the purpose of increasing the relative prioritization of those objective(s) relative to the other objectives in the compromise objective function. The weighting(s) for at least some of the other objective(s) may be correspondingly decreased (β). For example, in an embodiment, all of the weightings add up to 1 $((\alpha_1+ \ldots +\alpha_k)+(\beta_1+\beta_j)=1)$. Note that both α and β are a subset of ω. Again, α is a weighting that is being increased, while β is a weighting that is being decreased, for instance to allow for the α weighting to be increased. In this way, control model 162 is re-tuned by changing the weighting associated with one or more of the objectives.

At block 302, input(s) to module 118 may be received, which may include signal 8 with raised flag(s) from control model performance assessment module 116. Further, module 118 may obtain or already have a weighting for each of the objectives. Raised flags indicate objectives in the compromise objective function that are to be given a higher prioritization. If there are no flags raised for any of the objectives by control model performance assessment module 116, then the process proceeds to block 304 and no retuning of control model 162 is performed by control model tuning module 118. This may be indicated via signal 9 to control model 162 at edge module 160. If at block 302 it is determined that one or more flags have been raised, then the process proceeds to block 308, where at least some of the weightings of compromise objective function may be adjusted.

Figure 4:
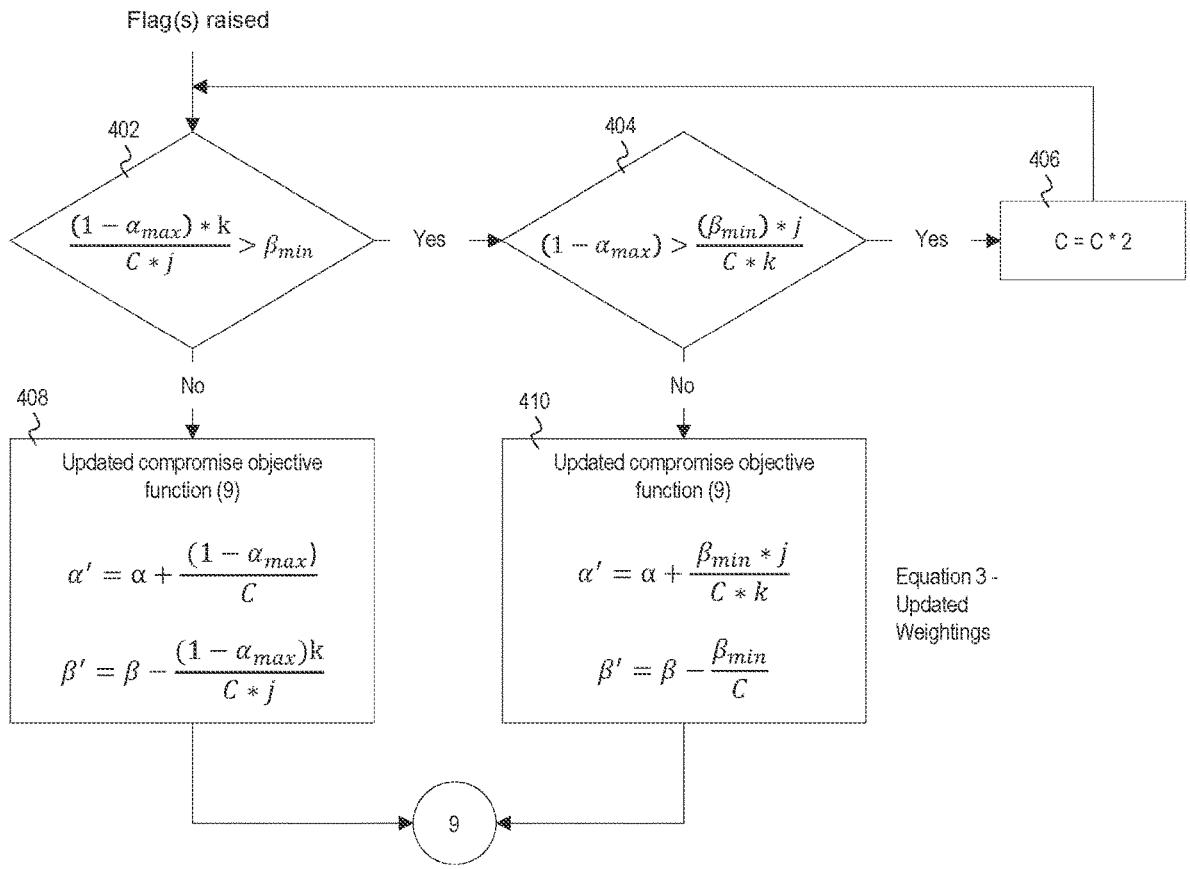
FIG. 4 is a diagram of an example process for adjusting the weightings of a compromise objective function.
Figure 4:
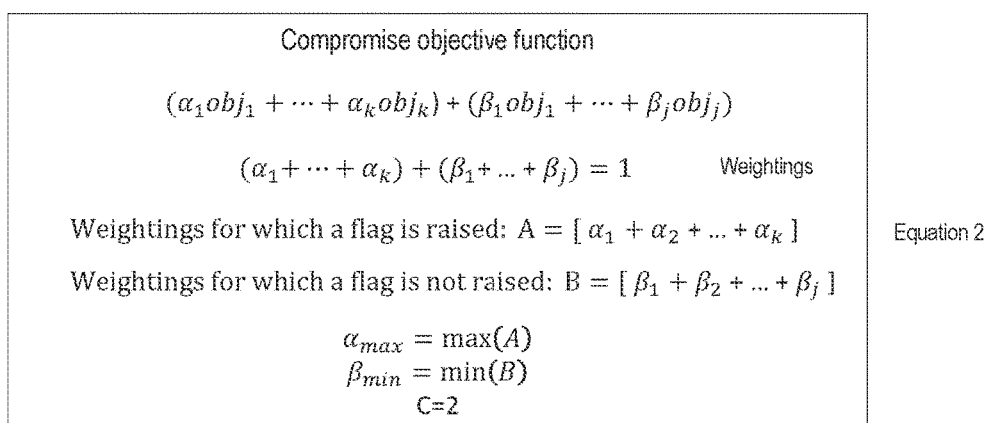

FIG. 4 shows an example process for adjusting the weightings of a compromise objective function.

One or more additive values may be calculated for the purpose of adjusting at least some of the weightings α and β in the compromise objective function. In an embodiment, an example way of calculating additive values is shown in FIG. 4. According to Equation 2 at block 308 in FIG. 3, if one or more flags have been raised in relation to the objectives, then one or more additive values may be calculated for adjusting at least some of the weightings α and β. The amounts by which weightings α and β may be adjusted are shown in the example of FIG. 4. It is to be appreciated that in other embodiments, the weightings may be adjusted in any other suitable way or ways.

In the example of FIG. 4, one or more checks may be performed before the weightings α and β are adjusted. Equation 2 shows the example compromise objective function, a list or set of weightings A for which a flag(s) has been raised, a list or set of weightings B for which a flag(s) has not been raised, $\alpha_{max}$ which is set to the maximum value in set A, $\beta_{min}$ which is set to the maximum value in set B, and variable C that is set to a value, which in this example is a value of 2. At block 402, a check is performed to ensure that the βmin weighting is not reduced too much such that it results in a negative β'. α' and β represent adjusted weightings. At block 402, the inequality $$\frac{(1-\alpha_{max})*k}{C*j} > \beta_{min}$$

is used for me check. If the inequality is not met, then the values of α' and β ' are updated as shown in block 408. The additive values at block 408 are the values that are added to α and subtracted from β. Alternatively, if the inequality at block 402 is met, then at block 404 a check is performed to the function evaluates the inequality $$(1-\alpha_{max}) > \frac{(\beta_{min})*j}{C*k}$$

ensure the αmax weighting is not increased too much such that it results in a α' value higher than 1. At block 404, the inequality $$(1-\alpha_{max}) > \frac{(\beta_{min})*j}{C*k}$$

is used for the check. If this inequality is not met, then the values of α' and β ' are updated as shown in block 410. The additive values at block 410 are the values that are added to α and subtracted from β. Alternatively, if the inequality at block 404 is met, then the value C is increased. In this example, the value of C is doubled. Increasing C ensures that the values added and subtracted to and from α and β are lower such that they do not end up with α values above 1 and β below 0, respectively. The process then repeats by checking the inequality at block 402, and so on. It is to be appreciated that in other embodiments, the weightings and checks, if any, may be performed in any other suitable way(s).

Once additive values have been calculated in block 308, where the weightings of the compromise objective function of control model 162 may be updated according to Equation 3 as follows, where α' is an updated weighing if a flag has been raised, and β ' if no flag has been raised. The updating of the weightings is considered a re-tuning of control model 162. For a given weighting α for objective j that needs to be increased in priority, the new weighting α' for objective j will then be increased according to Equation 3. For a given weighting β for objective k that needs to be decreased in priority, the new weighting β' for objective j will then be decreased according to Equation 3.

The updated weightings $α'_j$ and $β_j'$ may then be indicated via signal 9 to control model 162 at edge module 160, which may effectively adjust control model 162.

The following simplified examples illustrates the general concept. In the example, a system has four objectives. If no flags are raised, then the system proceeds to block 304, where no objectives are re-prioritized (meaning no adjustments will be made to the weightings). In another scenario, assume flags have been raised for objectives a1 and a2, which indicates that objectives corresponding to a1 and a2 should be increased in priority (no flags raised for objectives b1 and b2, therefore those objectives should be deprioritized). FIG. 4 illustrates how weightings a and b are adjusted. The weightings are then updated at based on Equation 3.

The result of the potential re-tuning at control model tuning module 118 may be outputted via signal 9, which may be transmitted to, or otherwise obtained by, control model 162, as shown in FIG. 1. The output of control model tuning module 118 indicating a re-tuning of control model 162 may be in any form, and may generally comprise and/or cause any suitable adjustment or other change to control model 162. For example, as described, the output may comprise updated coefficient weightings of an objective function. Further, the output may comprise or indicate an adjustment of one or more of rules of a rule-based control model, and/or adjustment of coefficients of a machine learning based control model, and/or a replacement of a model with a different control model, etc. However, other changes to control model 162 are contemplated.

Control model 162 operates to control controllable asset(s) among grid assets 190 in the power grid. Control model 162 may send, or otherwise provide, control signals (e.g. signal 10) to controllable assets within the power grid. The control signals may include any type of suitable control information, such as but not limited to the type(s) of power generation to use to supply power, and/or the proportions of the various types of power generation to use. These control parameters may be based on the relative priorities assigned to conflictive objectives of system 100, as described herein. The control signals may include other control information for providing control of controllable assets.

In at least some embodiments, the evaluating if the performance of control model 162 meets a predefined level of performance in relation to at least one of the plurality of objectives, and the re-tuning (e.g. adjusting) of an optimizer of the control model 162 in response to determining that the performance does not meet a predefined level may be performed in real-time or near real-time. Further, in an embodiment, receiving live operational data associated with the power grid system may be performed in real-time or near real-time along with the evaluating and the determining. Further, in an embodiment, generating historical performance information of the controller in relation to at least one of the plurality of conflicting objectives based on the received live operational data may be performed in real-time or near real-time along with the evaluating and the determining.

A simple, non-limiting example is now described to further illustrate some of the concepts, aspects, and features according to the present disclosure.

An example system, such as one similar to system 100 of FIG. 1, is provided with the following three example sources of power generation, namely coal generation, gas peaking generation, and solar generation.

In the example system, a balance of the three sources of generation is desired that maximizes the various conflicting objectives. For example, it is desirable to maximize the predictability and reliability of the overall grid system using dispatchable generation such as coal and gas fired plants. However, coal and gas typically generate a lot of $CO_2$ emissions, and also may have a higher cost of generation than solar. In particular, gas peaking generation is often more expensive than coal generation.

To even further simplify the example, the following three conflicting objectives will be used: reliable and predictable generation, $CO_2$ emissions, and energy cost:

| Objective 1 | KPI1 | Maximize reliability and predictability of power generation |
| Objective 2 | KPI2 | Maximize $CO_2$ emission savings from power generation |
| Objective 3 | KPI3 | Maximize energy cost savings |

In operation, the system gathers data from the power grid, such as current solar generation, customer electrical demand, electrical prices, etc. These parameters in part make up operational data, which will be used by an estimation model module, such as module 120 in FIG. 1. The estimation model module may therefore have the following estimation models:

| Model 1 | What is the best blend of power generation types that will maximize the reliability and predictability of the system? Under this scenario, what is the amount of $CO_2$ emissions saved? |
| Model 2 | What is the best blend of power generation types that will maximize $CO_2$ emissions savings? Under this scenario, how reliable and predictable is the system? |
| Model 3 | What is the best blend of power generation types that will maximize the energy cost savings of the system? Under this scenario, what is the energy cost savings of the system? |

Estimation models 1, 2 and 3 will each generate the following model KPIs:

| KPI1 | How reliable and predictable is the system? |
| KPI2 | How much $CO_2$ emissions saved? |
| KPI3 | How much energy cost saved? |

As previously described with reference to estimation model module 120 in FIG. 1, here the estimation models 1, 2, and 3 are greedy and only optimize for their own respective objective. For example, estimation model 1 only optimizes to maximize reliability and predictability of the system (KPI1), and does so without any regard to the amount of $CO_2$ emissions saved (KPI2) or energy costs savings (KPI3). Thus, it may be expected that a value for KPI2 generated by estimation model 1 is very low. Maximizing the reliability and predictability of the system may be indifferent to the energy costs (KPI3), since both coal and gas peaking are both typically dispatchable resources. Estimation model 2 only optimizes to maximize CO2 emissions saved (KPI2), and does so without any regard to the reliability and predictability of the system (KPI1). Thus, it may be expected that a value for KPI1 generated by estimation model 2 is very low. Since coal generation generates significantly more CO2 emissions than gas peaking while being significantly more expensive, it may be expected that estimation model 2 to have an uncertain effect on KPI3. Prioritizing objective 3 to maximize energy cost savings may result in additional use of renewable energy (low marginal cost) at the cost of reduced system reliability, and possibly CO2 emissions savings.

The output of the estimation model module may be the following:

| | Estimation model module Output | | |
|---|---|---|---|
| | KPI1—Objective 1 Maximize reliability and predictability of power generation | KPI2—Objective 2 Maximize CO2 emissions saved from power generation | KPI3—Objective 3 Maximize energy cost savings |
| Est Model 1 | KPI1 will be highest (this is MKPI1) | KPI2 expected to be very low | KPI3 may be low |
| Est Model 2 | KPI1 expected to be low | KPI2 will be highest (this is MKPI2) | KPI3 is uncertain |
| Est Model 3 | KPI1 is uncertain | KPI2 may be low | KPI3 will be highest (this is MKPI3) |

Accordingly, model KPI1 (MKPI1) is the KPI1 that measures reliability and predictability of the system if it was maximized by estimation model 1 without any regard to CO2 emissions saved or to energy cost savings. Model KPI2 (MKPI2) is the KPI2 that measures CO2 emissions saved of the system if it was maximized by estimation model 2 without any regard to reliability and predictability of the system or to energy cost savings. Model KPI3 (MKPI3) is the KPI3 that measures energy cost savings of the system if it was minimized by estimation model 3 without any regard to reliability and predictability of the system or to CO2 emissions saved.

In this example, a control model running at the edge module, similar to FIG. 1, may be a model that optimizes according to some predefined preferences, for example the preference specified by an operator of the grid system (for example operator 170 in FIG. 1). The preferences may relate to the relative priorities assigned to each of the conflicting objectives, and may be in the form of, or comprise, weightings ($\alpha_n$ and $b_n$) for use in a compromise objective function.

A control model may be initially configured based on the preference to prioritize CO2 emissions saved (KPI2) over the other two objectives. During operation, the performance assessment module (e.g. similar to module 116 in FIG. 1) monitors the performance of the control model and system, by assessing HKPI1, HKPI2, and HKPI3 values in relation to HMKPI1, HMKPI2, and HMKPI3 and in relation to $Th_{KPI1}$, $Th_{KPI2}$, and $Th_{KPI3}$. If any of the HKPI1, HKPI2, and HKPI3 values drift too far, then the control model may be re-tuned by a control model tuning module (e.g. similar to module 118) to adjust the prioritization of the objectives in the control model.

The thresholds $Th_{KPIn}$ are set as follows. Again, a lower $Th_{KPI}$ value corresponds to a higher priority for the given objective.

| | | |
|---|---|---|
| Th KPI 1 | Maximize Reliability and Predictability | 0.80 |
| Th KPI 2 | Maximize CO2 Emissions Saved | 0.10 |
| Th KPI 3 | Maximize Energy Cost Savings | 0.20 |

The following table shows some example data of the system at 5 points in time, namely time steps 1-5.

TABLE 1

| | | Time Step | | | | |
|---|---|---|---|---|---|---|
| | Variable | 1 | 2 | 3 | 4 | 5 |
| HMKPI 1 | Maximize Reliability and Predictability | 103.0 | 97.0 | 85.0 | 112.0 | 99.0 |
| HMKPI 2 | Maximize CO2 Emissions Saved | 9.0 | 5.0 | 10.3 | 10.2 | 8.8 |
| HMKPI 3 | Maximize Energy Cost Savings | 1.5 | 0.2 | 3.2 | 5.0 | 1.2 |
| HKPI 1 | Maximize Reliability and Predictability | 99.0 | 67.0 | 75.0 | 80.0 | 93.0 |
| HKPI 2 | Maximize CO2 Emissions Saved | 4.6 | 4.9 | 8.9 | 6.5 | 8.0 |
| HKPI 3 | Maximize Energy Cost Savings | 0.9 | 0.1 | 3.2 | 5.5 | 1.1 |
| HKPI ≤ HMKPI? | Objective 1 | YES | YES | YES | YES | YES |
| | Objective 2 | YES | YES | YES | YES | YES |
| | Objective 3 | YES | YES | NO | NO | YES |

With reference to FIG. 2, the HKPI and HMKPI values, and the $Th_{KPI}$ values, are obtained. The inequality of box 206 is then checked. The results are shown above in Table 1 as "YES" and "NO".

At each time step, the inequality of Equation 1 is checked, corresponding to box 210 in FIG. 2. The various values are calculated and it is determined if the inequality of Equation 1 is satisfied, as shown below. Then, a flag is to be raised for the given objective/KPI at box 212 when the inequality is not satisfied. No action is taken, meaning no flag is raised, at box 214 when the inequality is satisfied.

| | | | | | | |
|---|---|---|---|---|---|---|
| $\dfrac{HMKPI_m - HKPI_m}{HMKPI_m}$ | Objective 1 | 0.04 | 0.31 | 0.12 | 0.29 | 0.06 |
| | Objective 2 | 0.49 | 0.02 | 0.14 | 0.36 | 0.09 |
| | Objective 3 | 0.40 | 0.70 | 0.00 | −0.10 | 0.08 |
| $Avg\left[\dfrac{HMKPI_j - HKPI_j}{HMKPI_j}\right] \forall j \in [1 \ldots m]$ and $j \neq m$ | Objective 1 | 0.44 | 0.36 | 0.07 | 0.13 | 0.09 |
| | Objective 2 | 0.22 | 0.50 | 0.06 | 0.09 | 0.07 |
| | Objective 3 | 0.26 | 0.16 | 0.13 | 0.32 | 0.08 |
| $Th_{KPIm} \cdot Avg\left[\dfrac{HMKPI_j - HKPI_j}{HMKPI_j}\right]$ | Objective 1 | 0.36 | 0.29 | 0.05 | 0.11 | 0.07 |
| | Objective 2 | 0.02 | 0.05 | 0.01 | 0.01 | 0.01 |
| | Objective 3 | 0.05 | 0.03 | 0.03 | 0.06 | 0.02 |

| | | | | | | |
|---|---|---|---|---|---|---|
| Inequality of Equation 1 Satisfied? | Objective 1 | YES | NO | NO | NO | YES |
| | Objective 2 | NO | YES | NO | NO | NO |
| | Objective 3 | NO | NO | YES | YES | NO |
| Flag Raised? | Objective 1 | NO | YES | YES | YES | NO |
| | Objective 2 | YES | NO | YES | YES | YES |
| | Objective 3 | YES | YES | NO | NO | YES |

A flag is set to indicate that the control model needs, or may need, to be re-tuned to increase the priority of the second objective in the compromise objective function. Based on the flag value, and possibly other factors such as those described above in relation to module 118 in FIG. 1, the control model tuning module may cause an adjustment of the control model to increase the priority of the second objective in its compromise objective function, by for example changing model weights, model rules, or adding, removing, or replacing models, in the control model. The effect of the re-tuning of the control model is seen at time step 5 where the weightings of KPI1 and KPI2 are adjusted, which represents an increase in the priority of the second objective relative to the priority of the first objective.

Over time, the actual KPI values (HKPI 1, HKPI 2, HKPI 3) are monitored, and a flag may be set for a given KPI if the HKPI drifts below the threshold described below.

The threshold being referred to in this example is the normalized difference between HMKPIi and HKPIi multiplied by the average of the normalized differences between HMKPIi and HKPIi for the other objectives. As specified earlier, HMKPI represents the theoretical model behavior when the optimization is tuned solely for one objective. HKPI represents the actual behavior of the system in the real world deployment. The $$\frac{HMKPI_m - HKPI_m}{HMKPI_m}$$

term normalizes the distances between the different HKPI/HMKPI for the various objectives, so that the objectives with larger values do not dominate the others.

If the difference between HMKPI and HKPI exceeds a certain threshold amount $Th_{KPI}$ (relative to the average of the other HMKPI and HKPI), $$Th_{KPIm} \cdot Avg\left[\frac{HMKPI_j - HKPI_j}{HMKPI_j}\right] \forall j \in [1 \ldots m] \text{ and } j \neq m),$$

then the flag is raised and the weightings are re-adjusted. The threshold value $Th_{KPIm}$ may be some number between 0 and 1, and may represent the operators preference. A lower threshold $Th_{KPIm}$ value is indicative of a higher prioritization of an objective.

If the distance between HMKPI and HKPI exceeds the average of the differences between HMKPI and HKPI for the other objectives, multiplied by the user-defined threshold $Th_{KPIm}$, then the inequality no longer holds and a flag is raised.

$$\frac{HMKPI_m - HKPI_m}{HMKPI_m} <$$

$$Th_{KPIm} \cdot Avg\left[\frac{HMKPI_j - HKPI_j}{HMKPI_j}\right] \forall j \in [1 \ldots m] \text{ and } j \neq m$$

A flag is set for the given objective to indicate that the control model needs, or may need, to be re-tuned to increase the priority of the objective.

Figure 5:
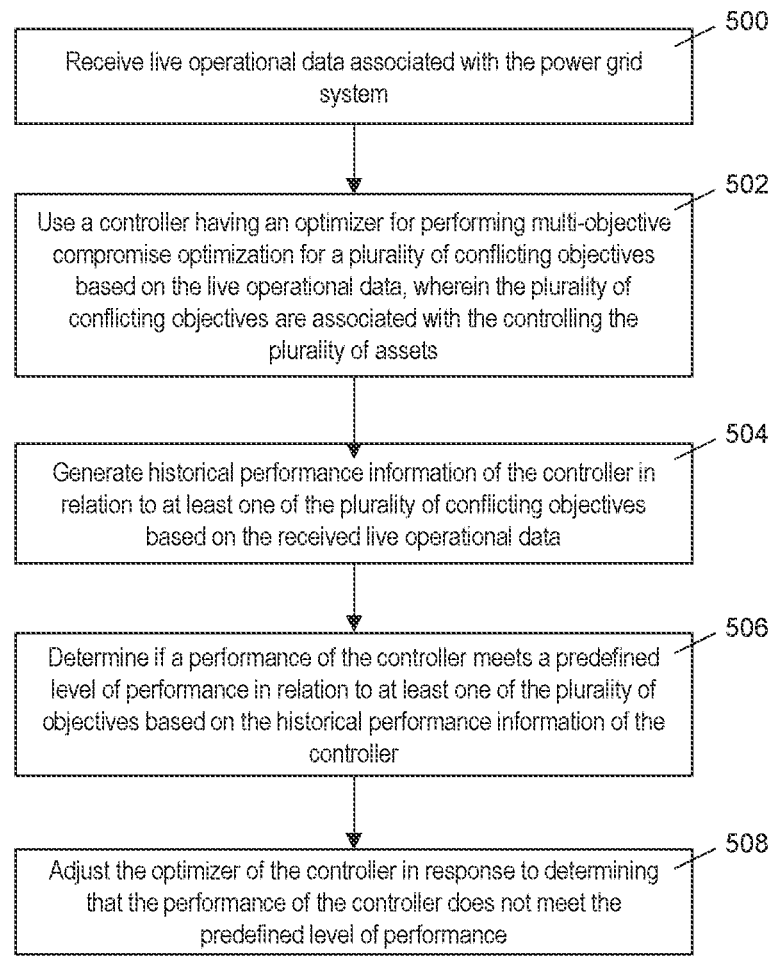
FIG. 5 is a process flow diagram of an example method.

FIG. 5 is a process flow diagram showing operations or steps of an example computer-implemented method according to an example embodiment. The method may be implemented using one or more electronic devices each having one or more processors and memory. The example method relates to controlling a plurality of assets in a power grid system.

At block 500, live operational data associated with the power grid system may be received.

At block 502, a controller having an optimizer may be used for performing multi-objective compromise optimization for a plurality of conflicting objectives based on the live operational data. The plurality of conflicting objectives may be associated with the controlling the plurality of assets.

At block 504, historical performance information of the controller in relation to at least one of the plurality of conflicting objectives may be generated based on the received live operational data.

In an embodiment, an estimation model may be used to perform a single-objective optimization for one of the plurality of conflicting objectives without regard to the other of the plurality of conflicting objectives. Historical model performance information of the controller in relation to the one of the plurality of conflicting objectives may be generated based on an outcome of the single-objective optimization. The determining if a performance of the controller meets a predefined level of performance in relation to the one of the plurality of conflicting objectives may based on the historical performance information and on the historical model performance information of the controller in relation to the one of the plurality of conflicting objectives.

At block 506, it may be determined if a performance of the controller meets a predefined level of performance in relation to at least one of the plurality of objectives based on the historical performance information of the controller.

In an embodiment, predefined threshold information associated with the at least one of the plurality of objectives may be received. This information may be based on some input received from a user, for example preference information relating to one or more of the objectives. The determining if a performance of the controller meets a predefined level of performance in relation to the at least one of the plurality of objectives may be further based on the predefined threshold information.

At block 508, the optimizer of the controller may be adjusted in response to determining that the performance of the controller does not meet the predefined level of performance.

In an embodiment, the adjusting the optimizer may comprise changing a prioritization of the at least one objective in the multi-objective compromise optimization for which the controller does not meet the predefined level of performance. In an embodiment, the changing a prioritization of the at least one objective may comprise changing a value of a coefficient associated with the at least one objective in a multi-objective compromise optimization function.

In an embodiment, the receiving, the generating, the determining, and the adjusting are all preformed within a predefined time interval, wherein the predefined time interval is 1 hour. In an embodiment, at least one of the plurality of assets in the power grid system receives power from a renewable power generation source.

References herein to CO2 and to greenhouse gases are not meant to be limiting. The teachings according to the present disclosure are applicable to other types of emissions.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In some embodiments, algorithms, techniques, and/or approaches according to the present disclosure may be performed or based on artificial intelligence (AI) algorithms, techniques, and/or approaches.

In some embodiments, the AI algorithms and techniques may include machine learning techniques.

Machine Learning (ML) may be used in power or energy systems, including energy asset management systems, with penetration of renewable energy such as wind, solar, or tidal energy, to improve the utilization of variable renewable resources and coordinate consumption/demand. Machine learning models may be used, as a mere example, to predict future resource availability and demand requirements, and/or control assets in a system, for instance using one or more optimizations. Predictions may be used for scheduling purposes, for example schedule EV charging, energy generation, storage, and/or pricing to optimally coordinate these energy systems to achieve various objectives such as cost minimization, efficiency maximization, or optimal use of local renewable energy. Further, predictors and/or optimizers, and the training thereof, may also be based on machine learning techniques.

A machine learning algorithm or system may receive data, for example historical data, streaming controllable asset data, environmental data, and/or third party data, and, using one or more suitable machine learning algorithms, may generate one or more machine learning datasets. Example types of machine learning algorithms include but are not limited to supervised learning algorithms, unsupervised learning algorithms, regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more machine learning datasets.

A control system may comprise one or more control policies. The control policies of the system may be based on trained machine learning systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. The present systems and methods may exploit the flexibility of controllable assets in the power system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire training data set. Online machine learning is sometimes useful where the data varies significantly over time, such as in power or energy pricing, commodity pricing, and stock markets. Further, online machine learning may be helpful when it is not practical or possible to train the agent over the entire data set.

In embodiments according to the present disclosure, optimizer training may be based on online reinforcement learning and/or off-line reinforcement learning.

Figure 6:
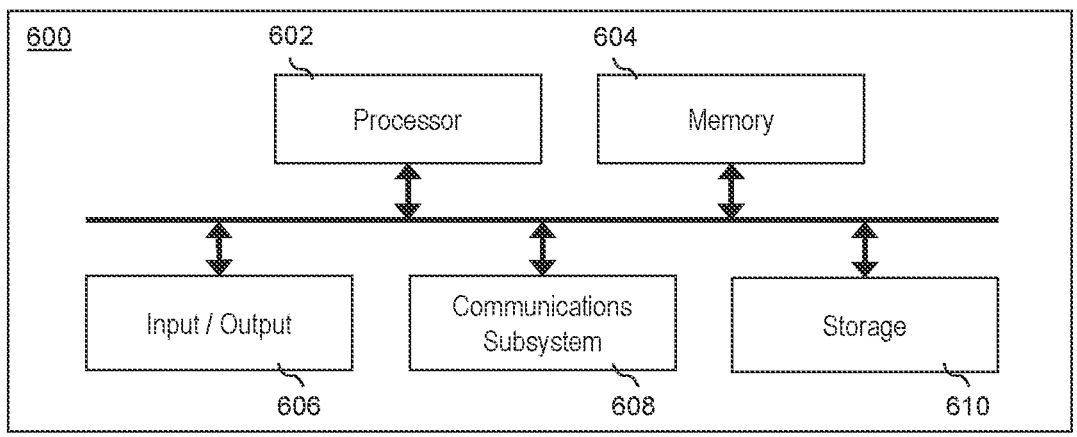
FIG. 6 is a block diagram of an example computerized device or system.

FIG. 6 is a block diagram of an example computerized device or system 600 that may be used in implementing one or more aspects or components of an embodiment according to the present disclosure. For example, system 600 may be used to implement a computing device or system, such as a controller, to be used with a device, system or method according to the present disclosure. Thus, one or more systems 600 may be configured to implement one or more portions of system 100, or system 100 in its entirety. This includes center subsystem 110 and/or edge subsystem 160.

Computerized system 600 may include one or more of a computer processor 602, memory 604, a mass storage device 610, an input/output (I/O) interface 606, and a communications subsystem 608. A computer processor device may be any suitable device(s), and encompasses various devices, systems, and apparatus for processing data and instructions. These include, as examples only, one or more of a programmable processor, a computer, a system on a chip, and special purpose logic circuitry such as an ASIC (application-specific integrated circuit) and/or FPGA (field programmable gate array).

Memory 604 may be configured to store computer readable instructions, that when executed by processor 602, cause the performance of operations, including operations in accordance with the present disclosure.

One or more of the components or subsystems of computerized system 600 may be interconnected by way of one or more buses 612 or in any other suitable manner.

The bus 612 may be one or more of any type of several bus architectures including a memory bus, storage bus, memory controller bus, peripheral bus, or the like. The CPU 602 may comprise any type of electronic data processor. The memory 604 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 610 may comprise any type of storage device configured to store data, programs, and other information and to make the data, programs, and other information accessible via the bus 612. In particular, device 610 may be configured to implement and/or store one or more of databases 112, 114 of system 100. The mass storage device 610 may comprise one or more of a solid-state drive, hard disk drive, a magnetic disk drive, an optical disk drive, or the like. In some embodiments, data, programs, or other information may be stored remotely, for example in the cloud. Computerized system 600 may send or receive information to the remote storage in any suitable way, including via communications subsystem 608 over a network or other data communication medium.

The I/O interface 606 may provide interfaces for enabling wired and/or wireless communications between computerized system 600 and one or more other devices or systems, such as an electric vehicle charging system according to the present disclosure. Furthermore, additional or fewer interfaces may be utilized. For example, one or more serial interfaces such as Universal Serial Bus (USB) (not shown) may be provided. Further, system 600 may comprise or be communicatively connectable to a display device, and/or speaker device, a microphone device, an input device such as a keyboard, pointer, mouse, touch screen display or any other type of input device.

Computerized system 600 may be used to configure, operate, control, monitor, sense, and/or adjust devices, systems, and/or methods according to the present disclosure.

A communications subsystem 608 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 608 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 608 may include one or more ports or other components (not shown) for one or more wired connections. Additionally or alternatively, communication subsystem 608 may include one or more transmitters, receivers, and/or antenna Further, computerized system 600 may comprise clients and servers. elements (none of which are shown).

Computerized system 600 of FIG. 6 is merely an example and is not meant to be limiting. Various embodiments may utilize some or all of the components shown or described. Some embodiments may use other components not shown or described but known to persons skilled in the art.

The concept of "near real-time" may be defined as operating using a pre-determined time interval or less, usually a relatively short time. A time interval for real-time is generally shorter than an interval for near real-time. Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

Center module or subsystem 110 and edge module or subsystem 160 may be implemented on separate computing devices, on a single computing device, or on several computing devices. In an embodiment, center subsystem 110 and edge subsystem 160 may be implemented in a distributed computing system wherein operations are performed at each of two or more computing devices. Other options and configurations are possible.

Some or all of center module 110, edge module 160, and other modules such as but not limited to modules 116, 118, 120, 162, 164 may be implemented, for example, on or using one or more electronic or other computer processors, computer memories, computer storage devices for storing one or more databases, as well as other computer hardware. Some or all of the modules may be software modules, and/or may comprise both computer software and hardware.

In other embodiments, the functions, operations, and/or structures of center subsystem 110 and edge subsystem 160 may not be divided as between the two subsystems 110 and 160 as shown and described with reference to FIG. 1. For example, some or all of the functions, operations, and/or structures of edge subsystem 160 may be located or performed at center subsystem 110. Alternatively, some or all of the functions, operations, and/or structures of center subsystem 110 may be located or performed at edge subsystem 160. Alternatively, the system could have only a single subsystem, which has all of the functions, operations, and/or structures of both subsystems 110, 160 described herein. Other configurations are also possible and contemplated.

Similarly, in other embodiments, the functions, operations, and/or structures of the various modules and subsystems may not necessarily be divided as shown and/or described herein. Rather, the functions, operations, and/or structures may be organized in any other suitable manner, including in one or more other modules and/or subsystems, and/or without any modules and/or subsystems.

Further, data or other information paths and signals, including those described herein and shown in the figures, may be different in other embodiments. For example, information and/or signal paths such as those represented by lines and/or arrows in FIGS. 1-3, may be communicated to or from parts or components other than those indicated by the lines and/or arrows in those figures.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations may be effected to the particular embodiments by those of skill in the art without departing from the scope, which is defined solely by the claims appended hereto.

The invention claimed is:

1. A method comprising:
at one or more electronic devices each having one or more processors and memory:
controlling a plurality of assets in a power grid system, the controlling comprising:
receiving live operational data associated with the power grid system;
using a controller having an optimizer for performing multi-objective compromise optimization for a plurality of conflicting objectives based on the live operational data, wherein the plurality of conflicting objectives are associated with the controlling the plurality of assets;
generating historical performance information of the controller in relation to at least one of the plurality of conflicting objectives based on the received live operational data;
using an estimation model to perform a single-objective optimization for one of the plurality of conflicting objectives without regard to the other of the plurality of conflicting objectives;
generating historical model performance information of the controller in relation to the one of the plurality of conflicting objectives based on an outcome of the single-objective optimization;
determining if a performance of the controller meets a predefined level of performance in relation to at least one of the plurality of objectives based on the historical performance information of the controller and on the historical model performance information of the controller in relation to the one of the plurality of conflicting objectives;
adjusting the optimizer of the controller in response to determining that the performance of the controller does not meet the predefined level of performance; and
providing control signal information for the plurality of assets for exerting control over the assets in the power grid system.

2. The method of claim 1, wherein the adjusting the optimizer comprises changing a prioritization of the at least one objective in the multi-objective compromise optimization for which the controller does not meet the predefined level of performance.

3. The method of claim 2, wherein the changing a prioritization of the at least one objective comprises changing a value of a coefficient associated with the at least one objective in a multi-objective compromise optimization function.

4. The method of claim 1, further comprising:
receiving predefined threshold information associated with the at least one of the plurality of objectives,
wherein the determining if a performance of the controller meets a predefined level of performance in relation to the at least one of the plurality of objectives is further based on the predefined threshold information.

5. The method of claim 1, wherein the receiving, the generating, the determining, and the adjusting are all preformed within a predefined time interval, wherein the predefined time interval is 1 hour.

6. The method of claim 1, wherein at least one of the plurality of assets in the power grid system receives power from a renewable power generation source.

7. A system, comprising:
one or more processors; and
memory storing instructions for execution by the one or more processors, the instructions for operations comprising:
controlling a plurality of assets in a power grid system, the controlling comprising:
receiving live operational data associated with the power grid system;

using a controller having an optimizer for performing multi-objective compromise optimization for a plurality of conflicting objectives based on the live operational data, wherein the plurality of conflicting objectives are associated with the controlling the plurality of assets;

generating historical performance information of the controller in relation to at least one of the plurality of conflicting objectives based on the received live operational data;

using an estimation model to perform a single-objective optimization for one of the plurality of conflicting objectives without regard to the other of the plurality of conflicting objectives;

generating historical model performance information of the controller in relation to the one of the plurality of conflicting objectives based on an outcome of the single-objective optimization;

determining if a performance of the controller meets a predefined level of performance in relation to at least one of the plurality of objectives based on the historical performance information of the controller and on the historical model performance information of the controller in relation to the one of the plurality of conflicting objectives;

adjusting the optimizer of the controller in response to determining that the performance of the controller does not meet the predefined level of performance; and providing control signal information for the plurality of assets for exerting control over the assets in the power grid system.

8. The system of claim 7, wherein the adjusting the optimizer comprises changing a prioritization of the at least one objective in the multi-objective compromise optimization for which the controller does not meet the predefined level of performance.

9. The system of claim 8, wherein the changing a prioritization of the at least one objective comprises changing a value of a coefficient associated with the at least one objective in a multi-objective compromise optimization function.

10. The system of claim 7, further comprising:
receiving predefined threshold information associated with the at least one of the plurality of objectives,
wherein the determining if a performance of the controller meets a predefined level of performance in relation to the at least one of the plurality of objectives is further based on the predefined threshold information.

11. The system of claim 7, wherein the receiving, the generating, the determining, and the adjusting are all preformed within a predefined time interval, wherein the predefined time interval is 1 hour.

12. The system of claim 7, wherein at least one of the plurality of assets in the power grid system receives power from a renewable power generation source.

13. A non-transitory computer-readable medium having computer-readable instructions stored thereon, the computer-readable instructions executable by at least one processor to cause the performance of operations comprising:

controlling a plurality of assets in a power grid system, the controlling comprising:
receiving live operational data associated with the power grid system;

using a controller having an optimizer for performing multi-objective compromise optimization for a plurality of conflicting objectives based on the live operational data, wherein the plurality of conflicting objectives are associated with the controlling the plurality of assets;

generating historical performance information of the controller in relation to at least one of the plurality of conflicting objectives based on the received live operational data;

using an estimation model to perform a single-objective optimization for one of the plurality of conflicting objectives without regard to the other of the plurality of conflicting objectives;

generating historical model performance information of the controller in relation to the one of the plurality of conflicting objectives based on an outcome of the single-objective optimization;

determining if a performance of the controller meets a predefined level of performance in relation to at least one of the plurality of objectives based on the historical performance information of the controller and on the historical model performance information of the controller in relation to the one of the plurality of conflicting objectives;

adjusting the optimizer of the controller in response to determining that the performance of the controller does not meet the predefined level of performance; and providing control signal information for the plurality of assets for exerting control over the assets in the power grid system.

14. The computer-readable medium of claim 13, wherein the adjusting the optimizer comprises changing a prioritization of the at least one objective in the multi-objective compromise optimization for which the controller does not meet the predefined level of performance.

15. The computer-readable medium of claim 14, wherein the changing a prioritization of the at least one objective comprises changing a value of a coefficient associated with the at least one objective in a multi-objective compromise optimization function.

16. The computer-readable medium of claim 13, the operations further comprising:
receiving predefined threshold information associated with the at least one of the plurality of objectives,
wherein the determining if a performance of the controller meets a predefined level of performance in relation to the at least one of the plurality of objectives is further based on the predefined threshold information.

17. The computer-readable medium of claim 13, wherein the receiving, the generating, the determining, and the adjusting are all preformed within a predefined time interval, wherein the predefined time interval is 1 hour.

* * * * *